(12) United States Patent
Chen et al.

(10) Patent No.: US 12,445,349 B2
(45) Date of Patent: Oct. 14, 2025

(54) FAULT TOLERANCE METHOD AND APPARATUS OF NETWORK DEVICE SYSTEM, COMPUTER DEVICE, AND STORAGE MEDIUM

(71) Applicant: HUNAN UNIVERSITY, Hunan (CN)

(72) Inventors: Guo Chen, Changsha (CN); Guihua Zhou, Changsha (CN); Hongbo Jiang, Changsha (CN); Zheng Qin, Changsha (CN)

(73) Assignee: HUNAN UNIVERSITY, Hunan (CN)

( * ) Notice: Subject to any disclaimer, the term of this patent is extended or adjusted under 35 U.S.C. 154(b) by 450 days.

(21) Appl. No.: 17/996,992

(22) PCT Filed: May 26, 2021

(86) PCT No.: PCT/CN2021/096067
§ 371 (c)(1),
(2) Date: Oct. 24, 2022

(87) PCT Pub. No.: WO2022/083122
PCT Pub. Date: Apr. 28, 2022

(65) Prior Publication Data
US 2023/0126682 A1   Apr. 27, 2023

(30) Foreign Application Priority Data
Oct. 21, 2020 (CN) .......................... 202011130912.2

(51) Int. Cl.
*H04L 41/0663* (2022.01)
*H04L 45/02* (2022.01)

(52) U.S. Cl.
CPC .......... *H04L 41/0663* (2013.01); *H04L 45/02* (2013.01)

(58) Field of Classification Search
CPC ............................ H04L 41/0663; H04L 45/02
(Continued)

(56) References Cited

U.S. PATENT DOCUMENTS

| | | | |
|---|---|---|---|
| 6,529,481 B2 * | 3/2003 | Akyol | H04L 45/586 370/396 |
| 6,931,441 B1 * | 8/2005 | Roden | H04L 45/42 370/255 |

(Continued)

FOREIGN PATENT DOCUMENTS

| | | |
|---|---|---|
| CN | 102594689 A | 7/2012 |
| CN | 106559254 A | 4/2017 |

(Continued)

OTHER PUBLICATIONS

International Search Report issued for International Patent Application No. PCT/CN2021/096067, Date of mailing: Aug. 13, 2021, 8 pages including English translation.
(Continued)

*Primary Examiner* — Anthony Mejia
(74) *Attorney, Agent, or Firm* — HSML P.C.

(57) ABSTRACT

The disclosure relates to a fault-tolerant method and apparatus for a network device system, a computer device, and a storage medium. The method includes: when the link state changes, the source switch acquires and transmits link state change information to the master controller, randomly selects a switch from the first switch unit or the second switch unit, and transmits a copy of the link state change information to the selected switch; such that the master controller forwards the link state change information to the second switch unit, the auxiliary controller receives the copy of the link state change information transmitted by the switch selected by the source switch and transmits it to the second switch unit; after the second switch unit updates the local routing table according to the acquired information, the master controller transmits confirmation information to the source switch.

12 Claims, 8 Drawing Sheets

(58) Field of Classification Search
USPC .......................................................... 370/217
See application file for complete search history.

(56) References Cited

U.S. PATENT DOCUMENTS

| | | | |
|---|---|---|---|
| 11,888,730 B1* | 1/2024 | Palermo | G06Q 20/00 |
| 2002/0167900 A1* | 11/2002 | Mark | H04L 45/028 370/410 |
| 2008/0192651 A1* | 8/2008 | Gibbings | H04L 45/52 370/254 |
| 2017/0285983 A1* | 10/2017 | Matsubara | G06F 3/0619 |
| 2017/0359253 A1 | 12/2017 | Yang et al. | |
| 2021/0099350 A1* | 4/2021 | Schmidt | H04L 45/48 |

FOREIGN PATENT DOCUMENTS

| | | |
|---|---|---|
| CN | 107395444 A | 11/2017 |
| CN | 108270669 A | 7/2018 |
| CN | 109218177 A | 1/2019 |
| CN | 110830324 A | 2/2020 |
| CN | 111294278 A | 6/2020 |
| CN | 112260971 A | 1/2021 |

OTHER PUBLICATIONS

Written Opinion issued for International Patent Application No. PCT/CN2021/096067, Date of mailing: Aug. 13, 2021, 8 pages including partial English machine translation.

Office Action issued for Chinese Patent Application No. 202011130912.2, dated May 8, 2021, 7 pages.

* cited by examiner

FAULT TOLERANCE METHOD AND APPARATUS OF NETWORK DEVICE SYSTEM, COMPUTER DEVICE, AND STORAGE MEDIUM

CROSS REFERENCE TO RELATED APPLICATION

The present application claims priority to Chinese Patent Application No. 202011130912.2, entitled "Fault-Tolerant Method and Apparatus for Network Device System, Computer Device and Storage Medium", and filed with the China National Intellectual Property Administration on Oct. 21, 2020, the entire content of which is hereby incorporated by reference herein.

TECHNICAL FIELD

The present disclosure relates to the field of computer communication technology, and particularly to a fault-tolerant method and apparatus for a network device system, a computer device and a storage medium.

BACKGROUND

Computer communication technology is a new communication manner formed by combining the computer technology and the communication technology, which can satisfy the requirements of data transmission. Computer terminals with independent functions and hardware devices such as routers and switches are connected by communication links, to realize resource sharing in the communication process. The communication between the controller and the switch in the existing network device system is mainly performed as follows: the switch directly reports the link change state information to the controller; the controller replies to the switch with confirmation information after receiving the link change state information, and transmits the link change state information to other influenced switches. The robustness of such direct communication manner is not strong, and such direct communication manner is prone to errors in the face of abnormal communication situations such as data errors, network failures or malicious attacks, and the fault tolerance of the network device system is low.

SUMMARY

In view of this, as for the above technical problem, it is necessary to provide a fault-tolerant method and apparatus for a network device system, and a computer device which can effectively improve the fault tolerance of the network device system.

In the first aspect, a network device system is provided, which includes a source switch, a first switch unit, a second switch unit, a master controller, and an auxiliary controller;
the source switch is configured to, when a link state changes, acquire link state change information, transmit the link state change information to the master controller, randomly select a switch from the first switch unit or the second switch unit, and transmit a copy of the link state change information to the switch selected by the source switch; wherein the first switch unit comprises each switch outside an influence range of the change of the link state, and the second switch unit comprises each switch within the influence range of the change of the link state;
the master controller is configured to receive the link state change information, and forward the link state change information to the second switch unit when determining that the link state is updated according to the link state change information;
the switch selected by the source switch is configured to acquire the copy of the link state change information, and transmit the copy of the link state change information to the auxiliary controller;
the auxiliary controller is configured to: receive the copy of the link state change information transmitted by the switch selected by the source switch, and randomly select a switch from the first switch unit, and transmit the copy of the link state change information to the second switch unit through the switch selected by the auxiliary controller;
the second switch unit is configured to: acquire the link state change information transmitted by the master controller and acquire the copy of the link state change information forwarded by the switch selected by the auxiliary controller, update a local routing table according to the link state change information or the copy of the link state change information, and transmit confirmation information to the master controller after updating the local routing table;
the master controller is configured to receive the confirmation information after the second switch unit updates the local routing table, and transmit the confirmation information to the source switch;
the source switch is configured to receive the confirmation information transmitted by the master controller.

In the second aspect, a fault-tolerant method for a network device system is provided, which is applied to a source switch and includes:
acquiring link state change information when a link state changes;
transmitting the link state change information to a master controller, randomly selecting a switch from a first switch unit or a second switch unit, and transmitting a copy of the link state change information to the switch selected by the source switch, such that the master controller forwards the link state change information to the second switch unit, and the switch selected by the source switch transmits the copy of the link state change information to the auxiliary controller, and the auxiliary controller transmits the copy of the link state change information to the second switch unit, wherein the first switch unit comprises each switch outside an influence range of the change of the link state, and the second switch unit comprises each switch within the influence range of the change of the link state;
receiving confirmation information transmitted by the master controller after the second switch unit updates a local routing table according to the link state change information or the copy of the link state change information.

In an embodiment, the step that the switch selected by the source switch transmits the copy of the link state change information to the auxiliary controller, and the auxiliary controller transmits the copy of the link state change information to the second switch unit includes:
transmitting, by the switch selected by the source switch, the copy of the link state change information to the auxiliary controller;

randomly selecting, by the auxiliary controller, a switch from the first switch unit, and transmitting the copy of the link state change information to the switch selected by the auxiliary controller;

transmitting, by the switch selected by the auxiliary controller, the copy of the link state change information to the second switch unit.

In an embodiment, the fault-tolerant method for the network device system further includes:

after transmitting the link state change information to the master controller, starting a source switch timer;

receiving the confirmation information transmitted by the master controller in a timing range of the source switch timer after the second switch unit updates the local routing table according to the link state change information or the copy of the link state change information;

returning to the step of transmitting the link state change information to the master controller when no confirmation information of the master controller is received beyond the timing range of the source switch timer.

In the third aspect, a fault-tolerant method for a network device system is provided, which is applied to a master controller and includes:

receiving link state change information transmitted by a source switch;

forwarding the link state change information to a second switch unit when determining that a link state is updated according to the link state change information, wherein the second switch unit comprises each switch within an influence range of the change of the link state;

acquiring confirmation information after the second switch unit updates a local routing table according to the link state change information and a copy of the link state change information transmitted by a switch which is selected by an auxiliary controller, and transmitting the confirmation information to the source switch.

In an embodiment, the fault-tolerant method for the network device system further includes:

after forwarding the link state change information to the second switch unit when determining that the link state is updated according to the link state change information, starting a master controller timer;

acquiring the confirmation information in a timing range of the master controller timer after the second switch unit updates a local routing table according to the link state change information and the copy of the link state change information transmitted by the switch which is selected by the auxiliary controller, and transmitting the confirmation information to the source switch;

transmitting no confirmation information to the source switch when no confirmation information of the second switch unit is received beyond the timing range of the master controller timer.

In the fourth aspect, a fault-tolerant apparatus for a network device system is provided, which is applied to a source switch and includes:

a link state change information acquisition module, configured to acquire link state change information when a link state changes;

a link state change information transmission module, configured to transmit the link state change information to a master controller, and randomly select a switch from a first switch unit or a second switch unit, and transmit a copy of the link state change information to the switch selected by the source switch, such that the master controller forwards the link state change information to the second switch unit, and the switch selected by the source switch transmits the copy of the link state change information to an auxiliary controller, and the auxiliary controller transmits the copy of the link state change information to the second switch unit by the auxiliary controller; wherein the first switch unit comprises each switch outside an influence range of the change of the link state, the second switch unit comprises each switch within the influence range of the change of the link state;

a confirmation information receiving module, configured to receive confirmation information transmitted by the master controller after the second switch unit updates a local routing table according to the link state change information or the copy of the link state change information.

In the fifth aspect, a fault-tolerant apparatus for a network device system is provided, which is applied to a master controller and includes:

a link state change information receiving module, configured to receive link state change information transmitted by a source switch;

a link state change information forwarding module, configured to forward the link state change information to a second switch unit when determining that a link state is updated according to the link state change information, wherein the second switch unit comprises each switch in an influence range of the change of the link state;

a confirmation information acquisition module, configured to acquire the confirmation information after the second switch unit updates a local routing table according to the link state change information and a copy of the link state change information transmitted by the switch selected by the auxiliary controller, and transmit the confirmation information to the source switch.

In the sixth aspect, a computer device is provided, including a processor, and a memory storing a computer program, the processor, when executing the computer program, implements the fault-tolerant method for the network device system in the above second or third aspect.

In the seventh aspect, a computer-readable storage medium is provided, on which a computer program is stored, the computer program, when executed by a processor, implements the steps of the fault-tolerant method for the network device system in the above second or third aspect.

For the fault-tolerant method and apparatus for the network device system, the computer device and storage medium, when the link state changes, the source switch acquires the link state change information, and transmits the link state change information to the master controller, and randomly selects a switch from the first switch unit or the second switch unit, and transmits a copy of the link state change information to the selected switch, such that the selected switch transmits the copy of the link state change information to the auxiliary controller, and then the master controller forwards the link state change information to the second switch unit, and the auxiliary controller transmits the copy of the link state change information to the second switch unit; then, the source switch receives the confirmation information transmitted by the master controller after the second switch unit updates the local routing table. In the embodiments of the present disclosure, the switch reports the link state change information to the controller; after receiving the link state change information, the controller may also select other switches to forward the link state change information in addition to directly forwarding the link state change information to the second switch unit. Through the redundant information transmission manner between the controller and the switches, the fault tolerance of the network device system can be effectively improved.

DETAILED DESCRIPTION

In order to make the objectives, technical solutions, and advantages of the present disclosure clearer, the present disclosure will be detailed with reference to the accompanying drawings and embodiments. It should be appreciated that the specific embodiments described here are only utilized to explain the present disclosure, rather than limiting the present disclosure.

Figure 1:
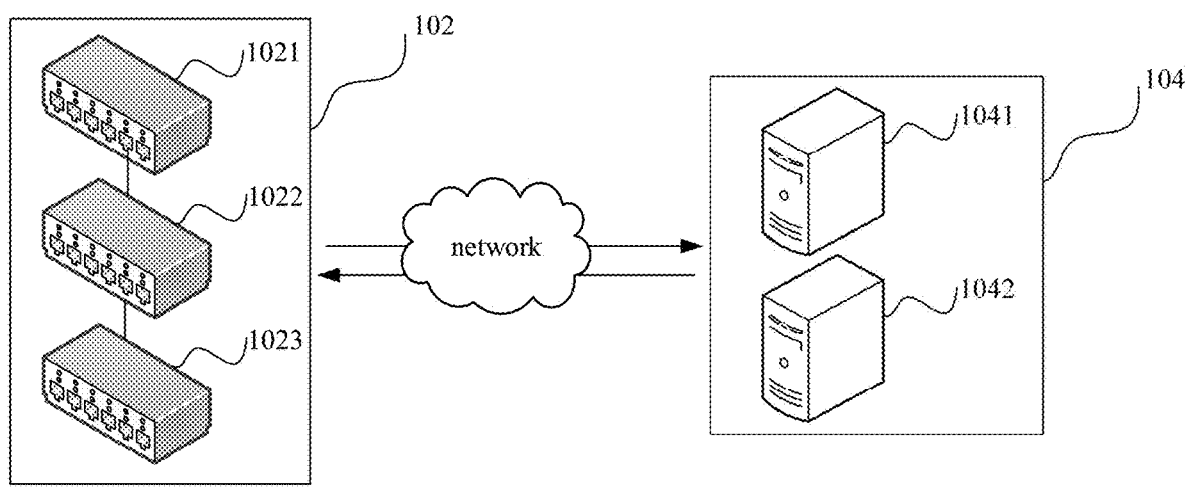
FIG. 1 is an application environment diagram of a network device system according to an embodiment.

A fault-tolerant method for a network device system provided in the present disclosure can be applied to an application environment as shown in FIG. 1. A switch unit 102 communicates with a controller unit 104 through the network. The switch unit 102 consists of multiple switches, and the controller unit 104 consists of multiple controllers. For example, the switch unit 102 consists of a source switch 1021, a first switch unit 1022, and a second switch unit 1023; and the controller unit 104 consists of a master controller 1041 and an auxiliary controller 1042.

It should be noted that the source switch 1021 is a switch configured to obtain link state change information, rather than not a particular switch. Any switch in the switch unit 102 can serve as the source switch 1021. The first switch unit 1022 includes a switch outside an influence range of the link state change, and there may be one or more switches according to a specific connection mode of the network device system. The second switch unit 1023 includes a switch within the influence range of the link state change, and there may be one or more switches according to a specific connection mode of the network device system. The master controller 1041 is a controller configured to receive and forward link state change information, rather than a particular controller. Any controller in the controller unit 104 may serve as the master controller 1041. The auxiliary controller 1042 is a controller configured to receive and forward a copy of the link state change information. Since each controller in the controller unit 104 deploys an election protocol, such as the Raft protocol, there are at least three auxiliary controllers.

When the link state changes, the source switch 1021 obtains the link state change information and transmits it to the master controller 1041, and randomly selects a switch from the first switch unit 1022 or the second switch unit 1023, and transmits a copy of the link state change information to the selected switch; then the selected switch transmits the copy of the link change state information to the auxiliary controller 1041. After receiving the copy of the link state change information, the auxiliary controller 1041 randomly selects a switch from the first switch unit 1022, and then the selected switch transmits the copy of the link state change information to the second switch unit 1023. After receiving the link state change information and determining that the link state is updated, the master controller 1041 transmits the link state change information to the second switch unit 1023; the second switch unit 1023 updates a local routing table according to the link state change information and the copy of the link state change information, and then transmits confirmation information of updating the local routing table to the master controller 1041. The master controller 1041 receives the confirmation information transmitted by the second switch unit 1023, and then transmits the confirmation information to the source switch 1021. The source switch 1021 receives the confirmation information transmitted by the master controller 1041.

Figure 2:
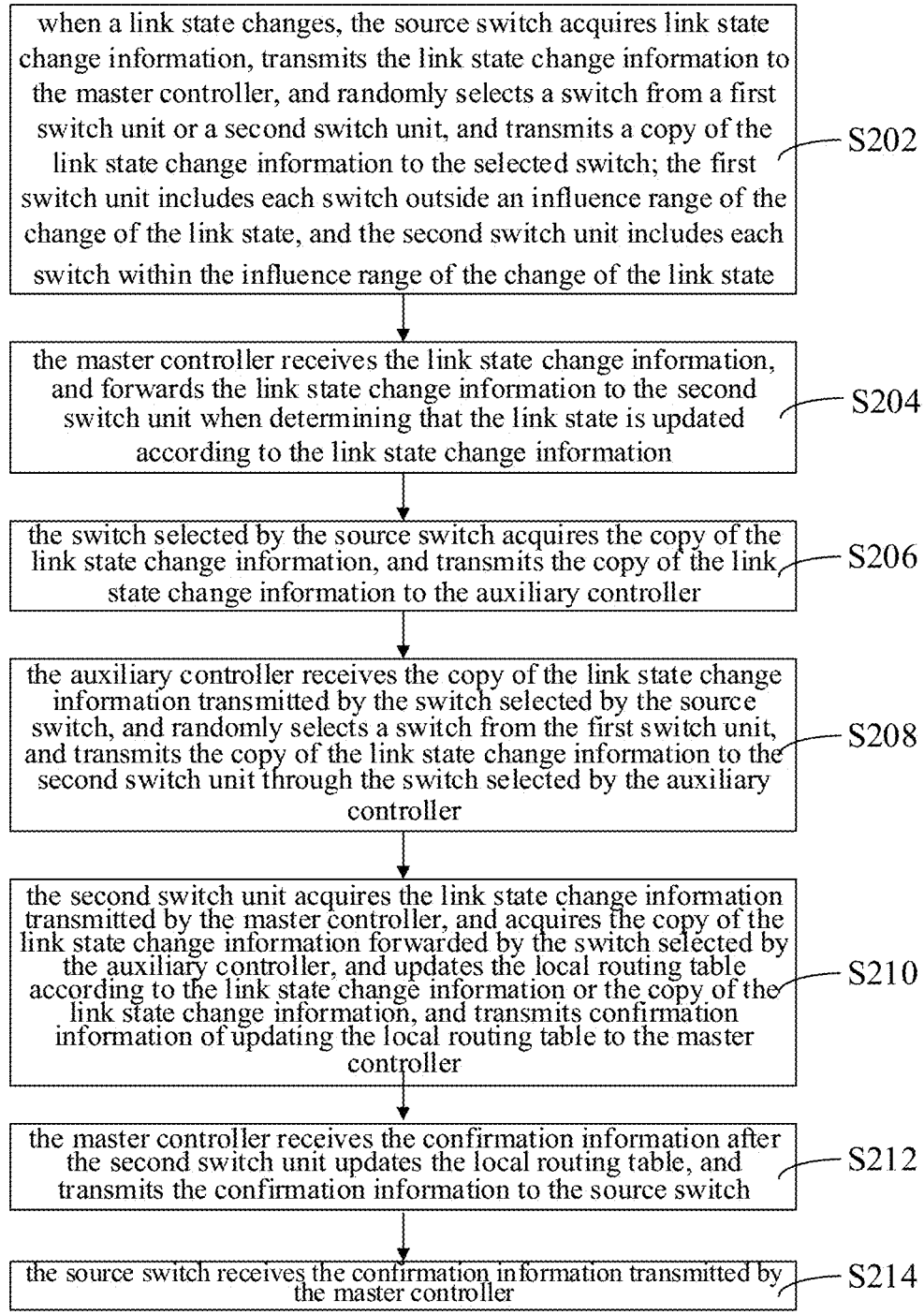
FIG. 2 is a flow chart showing information transmission in a network device system according to an embodiment.

In a first aspect, in an embodiment, as shown in FIG. 2, a network device system is provided. The network device system includes a source switch, a first switch unit, a second switch unit, a master controller, and an auxiliary controller. A process of information transmission of the network device system is provided as follows.

Step S202: when a link state changes, the source switch acquires link state change information, transmits the link state change information to the master controller, and randomly selects a switch from a first switch unit or a second switch unit, and transmits a copy of the link state change information to the selected switch; the first switch unit includes each switch outside an influence range of the change of the link state, and the second switch unit includes each switch within the influence range of the change of the link state.

In an embodiment, the switch is connected to the controller through a physical link. The switch is a network device for information transmission; and the controller is a network device that can coordinate and command the entire computer system.

In an embodiment, the switch can be summarized as a source switch, a first switch unit, and a second switch unit.

The source switch is a switch that can detect the change of the link state, rather than a particular switch. Any switch can serve as the source switch, and there is only one source switch. When the link state changes, switches outside the influence range form the first switch unit; and the number of switches in the first switch unit is determined by a specific connection mode of the network device system where the switches and controller are located. When the link state changes, the influenced switches in the influenced range form a second switch unit; and the number of switches in the second switch unit is also determined by the specific connection mode of the network device system where the switches and the controller are located.

In an embodiment, the controller can be summarized as a master controller and an auxiliary controller. A controller that can acquire and forward link state change information is referred to as the master controller. The master controller is not a particular controller. Any controller can serve as the master controller, and there is only one master controller. A controller that can acquire and forward a copy of the link state change information is referred to as the auxiliary controller. Each controller is deployed with an election protocol, such as the Raft protocol. Therefore, there are at least three auxiliary controllers.

In an embodiment, each switch in the network device system is pre-configured with a static address of a controller; and a long-term, two-way reliable transmission connection channel to the master controller is established through the network, for example, through the Transmission Control Protocol (TCP) to send and receive information, and this channel is referred to as a master channel.

In an embodiment, when the link state changes, the source switch acquires the link state change information (LS Message) after detecting the change of the link state; and each link state change information has a unique ascending order ID. For example, ID is an integer number ranging from 0 to 1000, and an ID of each new link state change information equal to an ID of a previous link state change information plus 1; and a step of modulo 1000 is performed for each progressive increment, that is, a remainder of the ID divided by 1000 is taken.

Specifically, when the link state changes, the source switch acquires the link state change information, transmits the link state change information to the master controller through the master channel, and randomly selects a switch from the first switch unit or the second switch unit, and transmits a copy of the link state change information to the selected switch.

In an embodiment, the source switch can randomly select a switch from all optional switches except the source switch according to the local routing table, that is, a switch is randomly selected from the first switch unit or the second switch unit, and the number of the randomly selected switches is determined by the specific connection mode of the network device system where the switches and the controller are located. In order to reduce transmission costs, a copy of the link state change information can be transmitted through the User Datagram Protocol (UDP).

Step S204: the master controller receives the link state change information, and forwards the link state change information to the second switch unit when determining that the link state is updated according to the link state change information.

In an embodiment, the master controller pre-stores all links and IDs corresponding to the links in the network device system where the switches and the controller are located. After receiving the link state change information, the master controller determines whether the link state is updated according to whether the ID of the link state change information is greater than the ID of the stored link. When it is determined that the link state is updated, each influenced switch within the influence range of the link state change is looked up through a data center network and the specific connection method of the network device system where the switches and the controller are located, and the link state change information is forwarded to each influenced switch through the master channel, that is, the second switch unit.

Specifically, the master controller receives the link state change information, and forwards the link state change information to the second switch unit when determining that the link state is updated according to the link state change information.

Step S206: the switch selected by the source switch acquires the copy of the link state change information, and transmits the copy of the link state change information to the auxiliary controller.

In an embodiment, the source switch randomly selects a switch from the first switch unit or the second switch unit according to the local routing table, and transmits the copy of the link state change information to the randomly selected switch; the randomly selected switch acquires the copy of the link change state information, and then transmits the copy of the link state change information to the auxiliary controller immediately.

Step S208: the auxiliary controller receives the copy of the link state change information transmitted by the switch selected by the source switch, and randomly selects a switch from the first switch unit, and transmits the copy of the link state change information to the second switch unit through the switch selected by the auxiliary controller.

In an embodiment, after receiving the copy of the link state change information, the auxiliary controller randomly selects a switch from the first switch unit, and transmits the copy of the link state change information to the second switch unit through the switch selected by the auxiliary controller. The switch selected by the source switch and the switch selected by the auxiliary controller can be the same or different.

In an embodiment, in order to reduce the transmission cost, the transmission of the copy of the link state change information can be performed through the User Datagram Protocol (UDP).

Step S210: the second switch unit acquires the link state change information transmitted by the master controller, and acquires the copy of the link state change information forwarded by the switch selected by the auxiliary controller, and updates the local routing table according to the link state change information or the copy of the link state change information, and transmits confirmation information of updating the local routing table to the master controller.

In an embodiment, the second switch unit may receive multiple link state change information with the same ID, including the link change state information transmitted by the master controller and the copy of the link state change information forwarded by the switch selected by the auxiliary controller. However, regardless of the link state change information or the copy of the link state change information received by the second switch unit, the second switch unit only processes the link change state information received first, and updates the local routing table based on the received link change state information received first. After updating the local routing table, the second switch unit may transmit the confirmation information of updating the local routing table to the master controller through the master channel regardless of whether the processed link change state information comes from the master controller or the auxiliary controller.

Step S212: the master controller receives the confirmation information after the second switch unit updates the local routing table, and transmits the confirmation information to the source switch.

In an embodiment, the master controller receives the confirmation information after the second switch unit updates the local routing table, and then transmits the confirmation information to the source switch through the master channel and other channels.

Step S214: the source switch receives the confirmation information transmitted by the master controller.

In an embodiment, the source switch receives the confirmation information transmitted by the master controller, then the process of the information transmission of the network device system ends.

In the above-mentioned network device system, when the link state changes, the source switch acquires the link state change information, and transmits the link state change information to the master controller, and randomly selects the switch from the first switch unit or the second switch unit, and transmits the copy of the link state change information to the selected switch; and then the selected switch transmits the copy of the link state change information to the auxiliary controller; then the master controller forwards the link change state information to the second switch unit, and the auxiliary controller transmits the copy of the link state change information to the second switch unit; then, the source switch receives the confirmation information transmitted by the master controller after the second switch unit updates the local routing table according to the link state change information or the copy of the link state change information. In the embodiment of the present disclosure, the switch reports the link state change information to the controller; after receiving the link state change information, the controller may also select other switches for forwarding in addition to directly forwarding the link state change information to the second switch unit. The redundant information transmission method between the controller and the switches can effectively improve the fault tolerance of the network device system.

Figure 3:
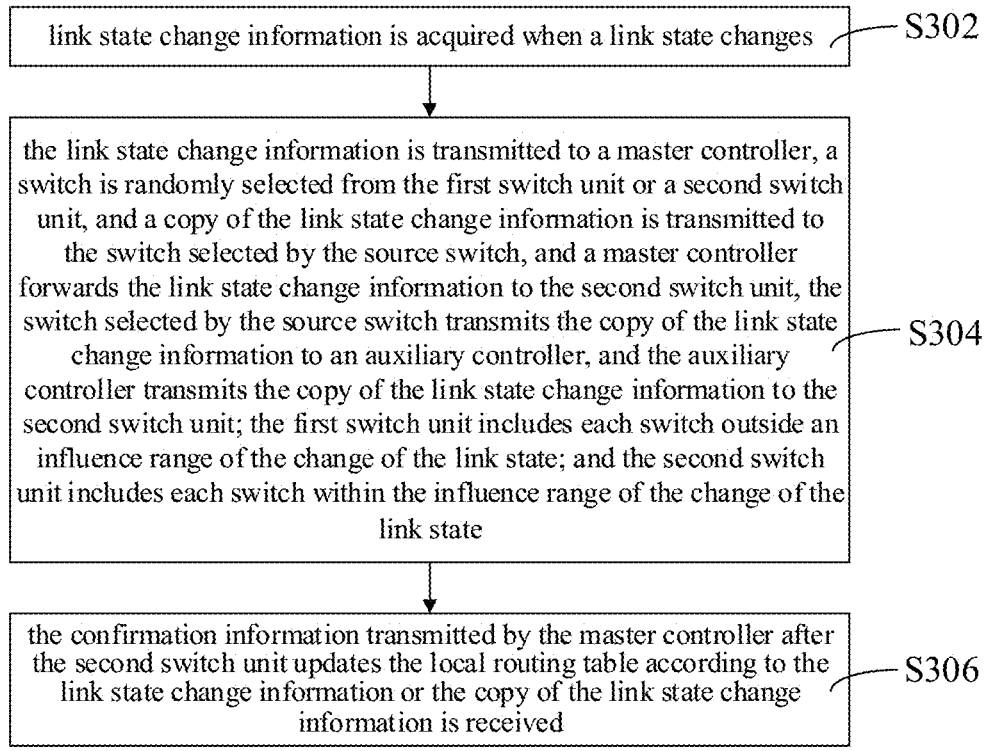
FIG. 3 is a flow chart showing a fault-tolerant method for a network device system according to an embodiment.

In a second aspect, in an embodiment, as shown in FIG. 3, a fault-tolerant method for a network device system is provided, which is applied to a source switch, and includes:

Step S302: link state change information is acquired when a link state changes.

Specifically, the source switch acquires the link state change information (LS Message) when detecting a change of a link state.

Step S304: the link state change information is transmitted to a master controller, a switch is randomly selected from the first switch unit or a second switch unit, and a copy of the link state change information is transmitted to the switch selected by the source switch, and a master controller forwards the link state change information to the second switch unit, the switch selected by the source switch transmits the copy of the link state change information to an auxiliary controller, and the auxiliary controller transmits the copy of the link state change information to the second switch unit; the first switch unit includes each switch outside an influence range of the change of the link state; and the second switch unit includes each switch within the influence range of the change of the link state.

Specifically, the source switch transmits the link state change information to the master controller through the master channel, and randomly selects a switch from the first switch unit or the second switch unit according to the local routing table, and transmits the copy of the link state change information to the selected switch. After the transmission of the link state change information is completed, the source switch waits for the master controller to reply with the confirmation information.

Step S306: the confirmation information transmitted by the master controller after the second switch unit updates the local routing table according to the link state change information or the copy of the link state change information is received.

Specifically, after the second switch unit updates the local routing table according to the link state change information or the copy of the link state change information, the master controller transmits the confirmation information to the source switch, and the source switch receives the confirmation information transmitted by the master controller.

Figure 4:
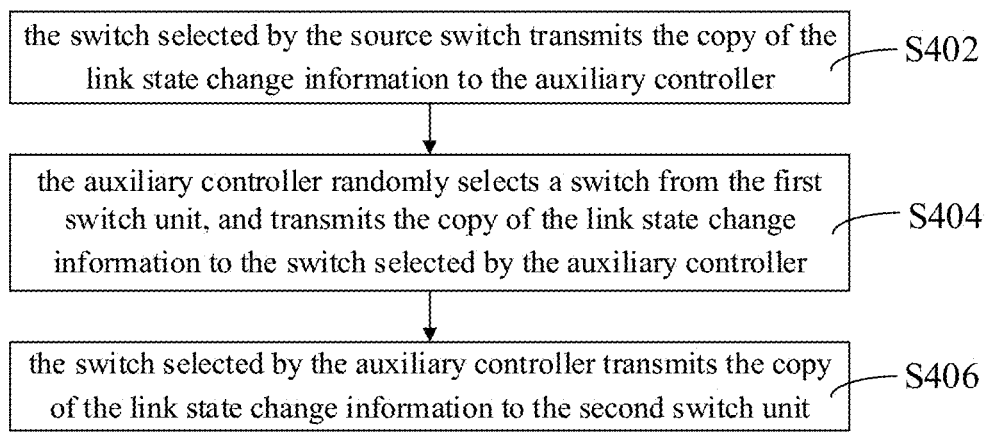
FIG. 4 is a flow chart showing information transmission between an auxiliary controller and a second switch unit according to an embodiment.

In an embodiment, as shown in FIG. 4, the step S304 in which the switch selected by the source switch transmits the copy of the link state change information to the auxiliary controller, and the auxiliary controller transmits the copy of the link state change information to the second switch unit, includes following steps.

Step S402: the switch selected by the source switch transmits the copy of the link state change information to the auxiliary controller.

Specifically, the source switch randomly selects a switch from the first switch unit or the second switch unit according to the local routing table, and transmits the copy of the link state change information to the selected switch. The selected switch immediately forwards the copy of the link state change information to the auxiliary controller after receiving the copy of the link state change information.

Step S404: the auxiliary controller randomly selects a switch from the first switch unit, and transmits the copy of the link state change information to the switch selected by the auxiliary controller.

Specifically, after receiving the copy of the link state change information, the auxiliary controller randomly selects a switch from the first switch unit according to the data center network, and transmits the copy of the link state change information to the selected switch.

Step S406: the switch selected by the auxiliary controller transmits the copy of the link state change information to the second switch unit.

Figure 5:
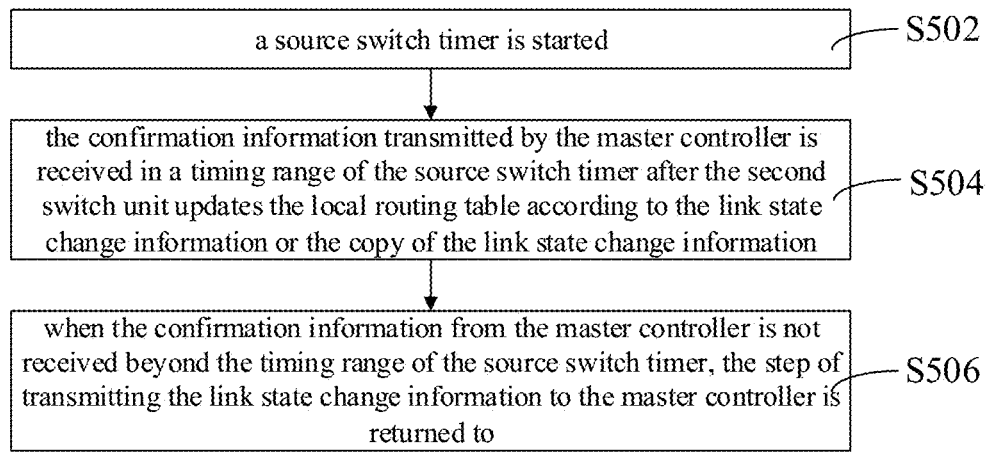
FIG. 5 is a flow chart showing information transmission between a source switch and a master controller according to an embodiment.

In an embodiment, as shown in FIG. 5, after the step S304 of transmitting the link state change information to the master controller, the method further includes following steps.

Step S502: a source switch timer is started.

In an embodiment, a timer is started while the source switch transmits the link state change information to the master controller, the timer is referred to as a source switch timer.

Specifically, the source switch timer is started and the confirmation information returned by the master controller is waited for.

Step S504: the confirmation information transmitted by the master controller is received in a timing range of the source switch timer after the second switch unit updates the local routing table according to the link state change information or the copy of the link state change information.

In an embodiment, a network administrator can determine the timing range of the source switch timer according to actual conditions. Within the timing range of the source switch timer, the source switch receives the confirmation information transmitted by the master controller after the second switch unit updates the local routing table. When all the confirmation information is received within the timing range, the process of information transmission of the network device system is completed.

Specifically, within the timing range of the source switch timer, the source switch receives the confirmation information forwarded by the master controller after the second switch unit updates the local routing table according to the link state change information or the copy of the link state change information.

Step S506: when the confirmation information from the master controller is not received beyond the timing range of the source switch timer, the step of transmitting the link state change information to the master controller is returned to.

In an embodiment, when all confirmation information is not received beyond the timing range of the source switch timer, the process of the information transmission of the network device system fails, and the step in which the source switch transmits the link state change information to the master controller is returned to, and the information transmission is restarted.

Specifically, when the source switch does not receive the confirmation information beyond the timing range of the source switch timer, the step in which the source switch transmits the link state change information to the master controller is returned to.

Figure 6:
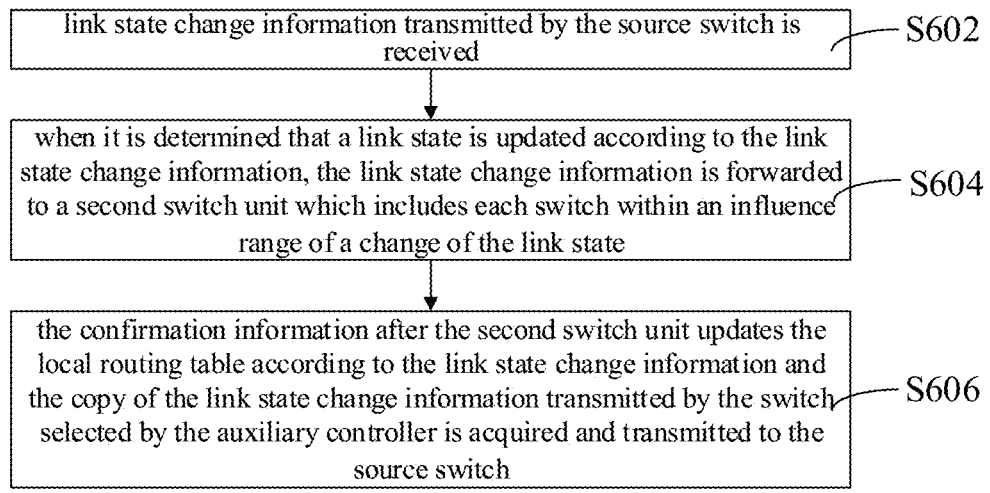
FIG. 6 is a flow chart showing a fault-tolerant method for a network device system according to another embodiment.

In a third aspect, in an embodiment, as shown in FIG. 6, a fault-tolerant method for a network device system is provided, which is applied to a master controller, and includes following steps.

Step S602: link state change information transmitted by the source switch is received.

Specifically, the master controller receives link state change information (LS Message) transmitted by the source switch.

Step S604: when it is determined that a link state is updated according to the link state change information, the link state change information is forwarded to a second switch unit which includes each switch within an influence range of a change of the link state.

Specifically, when determining that the link state is updated, the master controller forwards the received link state change information to each influenced switch within the influence range of the change of the link state, that is, the second switch unit.

Step S606: the confirmation information after the second switch unit updates the local routing table according to the link state change information and the copy of the link state change information transmitted by the switch selected by the auxiliary controller is acquired and transmitted to the source switch.

Specifically, after acquiring the confirmation information after the second switch unit updates the local routing table, the master controller transmits the confirmation information to the source switch.

Figure 7:
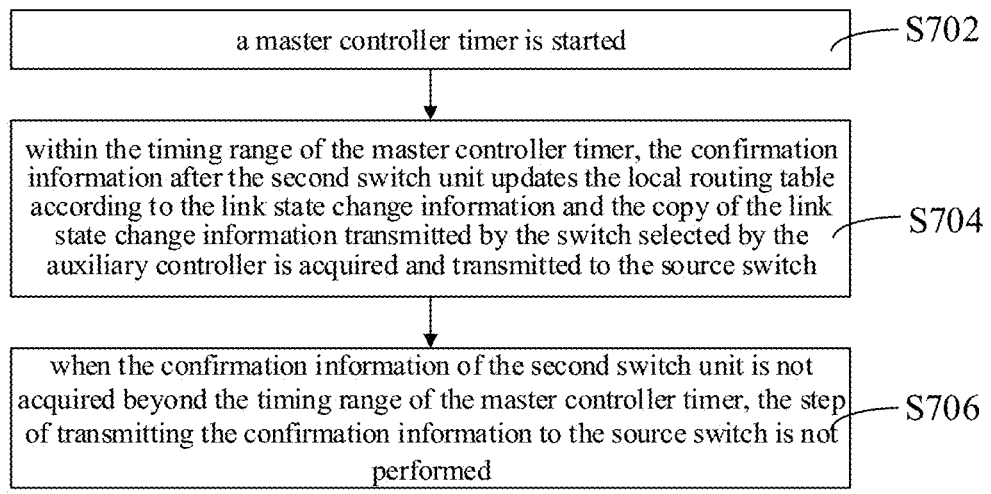
FIG. 7 is a flow chart showing information transmission between a master controller and a second switch unit according to another embodiment.

In an embodiment, as shown in FIG. 7, after the step S604 in which when it is determined that the link state is updated according to the link state change information, the link state change information is forwarded to the second switch unit, the method further includes following steps.

Step S702: a master controller timer is started.

In an embodiment, when the master controller forwards the link state change information to the second switch unit, each second switch receiving the forwarded link state change information is recorded. At the same time, a timer is started, which is referred to as the master controller timer.

Specifically, the master controller timer is started and the confirmation information returned by the second switch unit is waited for.

Step S704: within the timing range of the master controller timer, the confirmation information after the second switch unit updates the local routing table according to the link state change information and the copy of the link state change information transmitted by the switch selected by the auxiliary controller is acquired and transmitted to the source switch.

In an embodiment, the network administrator can determine the timing range of the master controller timer according to the actual situations. Within the timing range of the master controller timer, the master controller acquires the confirmation information after the second switch unit updates the local routing table, and transmits the confirmation information to the source switch when confirmation information of the second switch is acquired within the timing range, then the process of the information transmission of the network device system is completed.

Specifically, within the timing range of the master controller timer, the master controller acquires the confirmation information after the second switch unit updates the local routing table, and transmits the confirmation information to the source switch.

Step S706: when the confirmation information of the second switch unit is not acquired beyond the timing range of the master controller timer, the step of transmitting the confirmation information to the source switch is not performed.

In an embodiment, when the confirmation information of the second switch is not received beyond the timing range of the master controller timer, the process of the information transmission of the network device system fails, and the master controller does nothing, that is, the master controller does not perform the step of transmitting the confirmation information to the source switch.

In the embodiments of the present disclosure, the redundant information transmission method of the network device system can effectively improve the fault tolerance of the network device system.

In an embodiment, the switch in the network device system can also perform a master channel failure detection.

Specifically, each switch periodically transmits a keep alive message to the master controller to detect the state of the master channel, and a transmitting interval is in minutes. When the switch detects the failure of the master channel, the switch selects other K switches according to the local routing table, and transmits a request of establishing an indirect master channel to the selected K switches, and establishes a reliable indirect maser channel of a data plane with other switches that respond first. The magnitude of K can be determined by the network administrator according to the actual situations, and the default magnitude of K is the number of available adjacent switches.

In an embodiment, the controller in the network device system also performs the master channel failure detection.

Specifically, the master controller periodically transmits a keep alive message to each switch to detect the state of the master channel, and the transmitting interval is in minutes. When the master controller detects a failure of the master channel with a certain switch, the master controller may also actively establish the indirect master channel.

In an embodiment, information synchronization is performed between the controllers.

Specifically, both the master controller and the auxiliary controller execute a synchronous election protocol in the background, such as the Raft protocol, with a purpose of detecting whether the master controller fails and reselecting a master controller. When the master controller transmits a fault and a new master controller is selected, each switch can be notified.

It should be understood that, although the steps in the flow charts involved in the foregoing embodiments are displayed in sequence as indicated by the arrows, these steps are not definitely performed in sequence according to the order indicated by the arrows. Unless there is a clear description in this article, there is no strict order for the execution of these steps, and these steps can be executed in other orders. Moreover, at least a part of the steps of the flow charts involved in the foregoing embodiments may include multiple steps or multiple stages. These steps or stages are not definitely executed at the same time, but may be executed at different time. The execution order of the steps or the stages is not definitely executed sequentially, but may be executed alternately or in turn with other steps or at least a part of the steps or stages in other steps.

In order to make the objectives, technical solutions, and advantages of the present disclosure clearer, the present disclosure will be detailed with reference to a specific embodiment. It should be understood that a specific embodiment described here is only utilized to explain the disclosure, rather than limiting the disclosure.

As shown in FIGS. 8 to 11, which shows a process of information transmission of a network device system according to a specific embodiment.

In a specific embodiment, the network device system can be summarized as a data plane and a control plane.

Switches used for production activities form the data plane. Specifically, the switch 150 in the data plane is the source switch; the switches 130, 140, and 160 form the first switch unit; and the switches 110 and 120 form the second switch unit. The source switch, the first switch unit, and the second switch unit all belong to the data plane.

A management network switch and a controller which are configured to manage the data plane form the control plane; and the controller may be a switch or other computer devices. Specifically, the control plane consists of the management network switches 210 to 260, the master controller 310, and the auxiliary controllers 320 and 330. Both the master controller and the auxiliary controller belong to the control plane. In this embodiment, the management network switches 210 to 260 are media for information transmission, and therefore, which will not be repeated here.

In a specific embodiment, the process of the information transmission of the network device system consists of steps 1 to 7.

Figure 8:
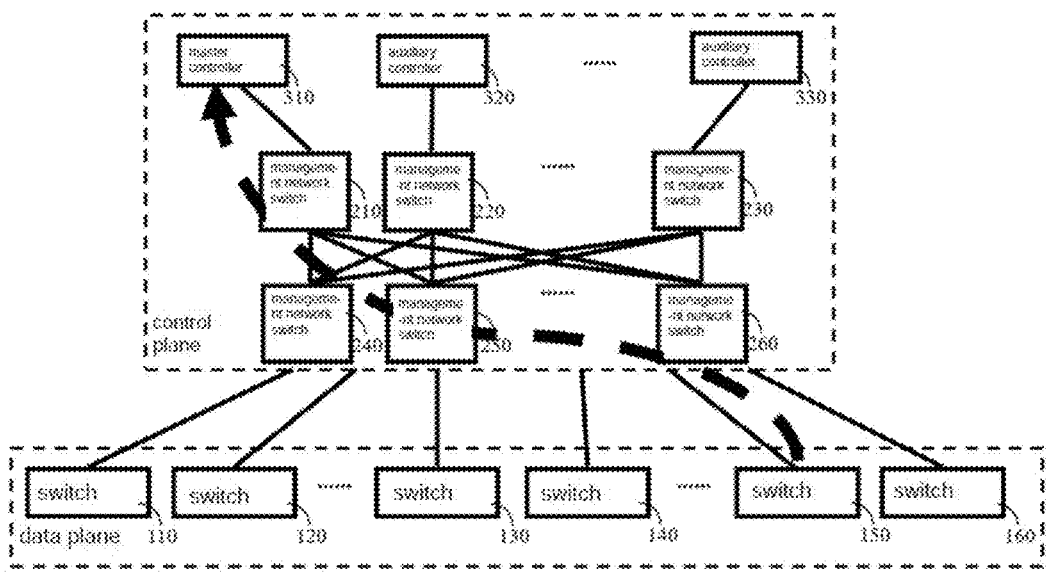
FIG. 8 is a flow chart showing information transmission between a source switch and a master controller according to an embodiment.

At step 1, as shown in FIG. 8, when the link state changes, the source switch 150 acquires the link state change information, and transmits the link state change information to the master controller 310 through the master channel. At the same time, the source switch timer is started, and the confirmation message returned by the master controller 310 is waited for.

Figure 9:
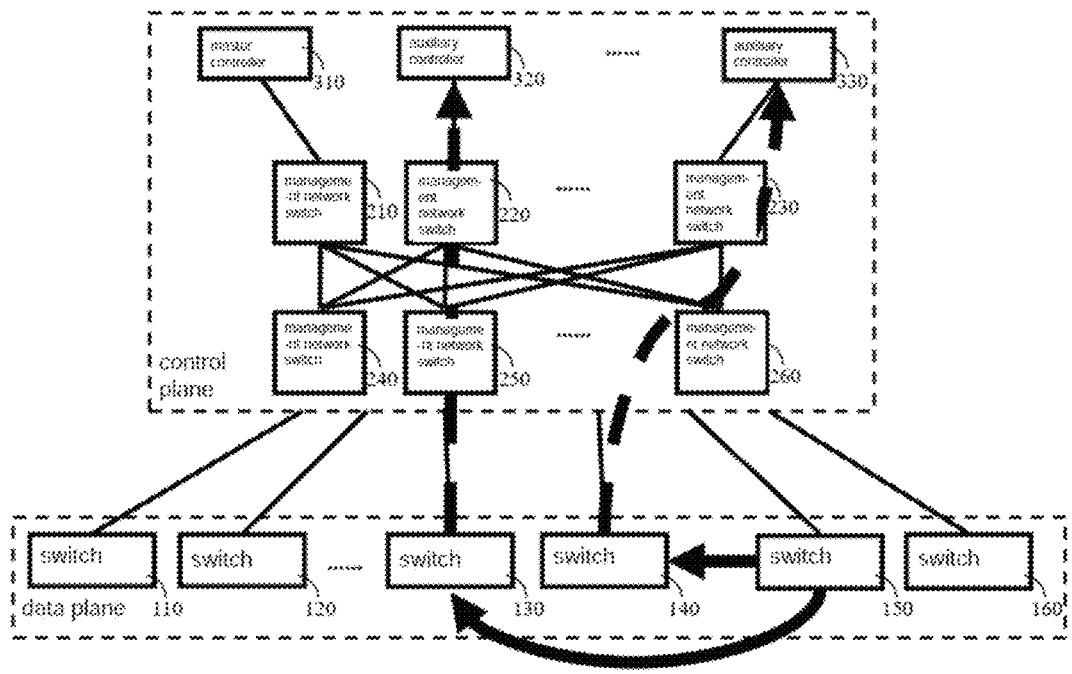
FIG. 9 is a flow chart showing information transmission between a source switch and an auxiliary controller according to an embodiment.

At step 2, as shown in FIG. 9, the source switch 150 randomly selects switches 130 and 140 from the first switch unit or the second switch unit according to the local routing table, and transmits a copy of the link state change information to the selected switches 130 and 140. After receiving the copy of the link state change information, the switches 130 and 140 immediately forward the copy of the link state change information to the auxiliary controllers 320 and 330 through a user datagram protocol.

Figure 10:
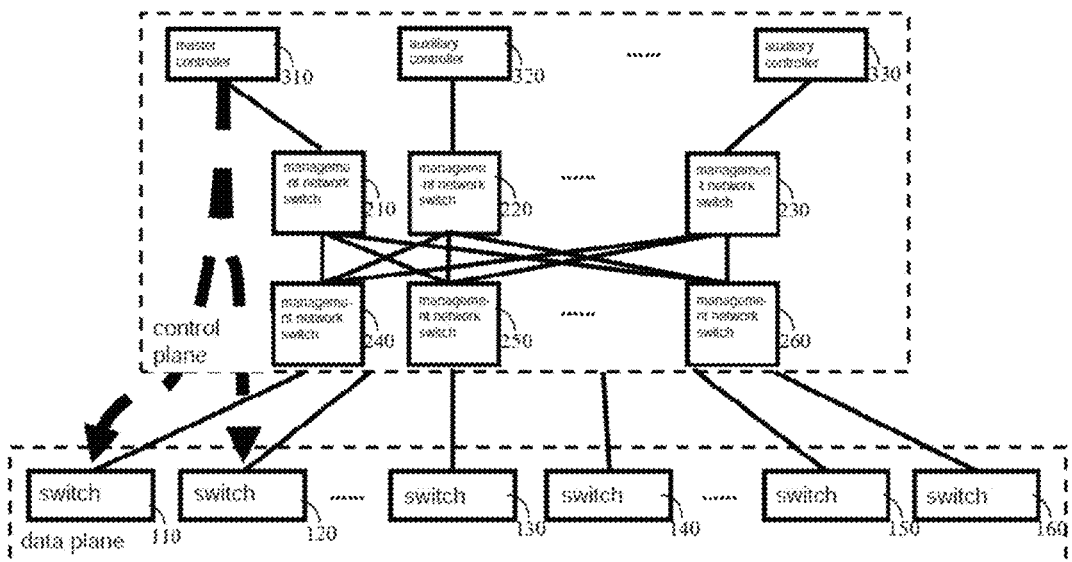
FIG. 10 is a flow chart showing information transmission between a master controller and a second switch unit according to an embodiment.

At step 3, as shown in FIG. 10, the master controller 310 receives the link state change information, and when determining that the link state is updated according to the ID of the link state change information, the master controller 310 forwards the link state change information to switches 110 and 120 through the master channel.

Figure 11:
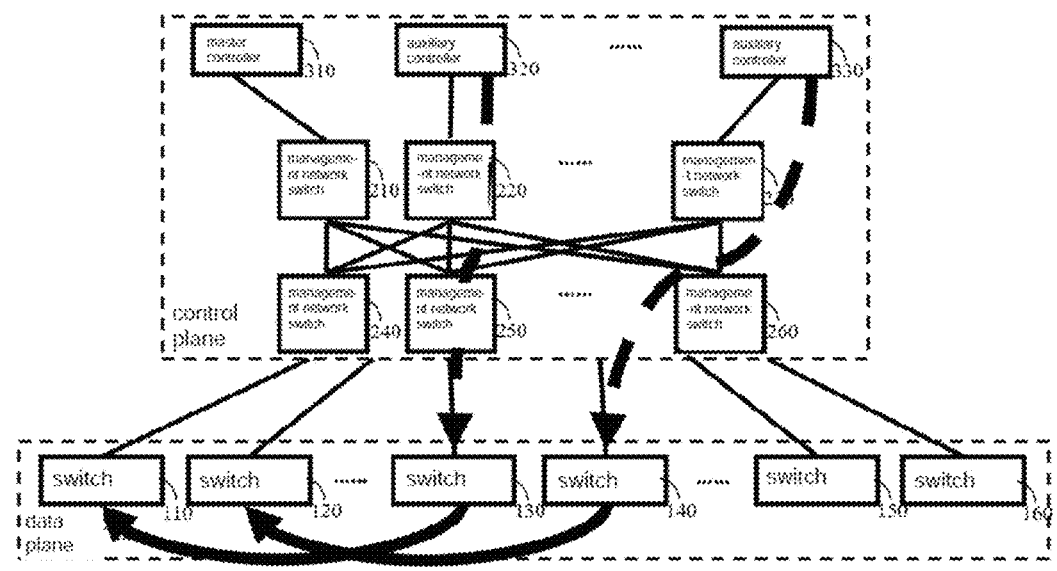
FIG. 11 is a flow chart showing information transmission between an auxiliary controller and a second switch unit according to an embodiment.

At step 4, as shown in FIG. 11, the auxiliary controllers 320 and 330 randomly select the switches 130 and 140 from the first switch unit, and transmit the copy of the link state change information to the selected switches 130 and 140. After receiving the copy of the link state change information, the switches 130 and 140 immediately forward the copy of the link state change information to the switches 110 and 120 through the user datagram protocol.

At step 5, the switches 110 and 120 receive the link state change information transmitted by the master controller 310 and the copy of the link state change information forwarded by the switches 130 and 140; the switches 110 and 120 update the local routing table according to the link state change information received first, and transmit the confirmation information after updating the local routing table to the master controller 310 through the master channel.

At step 6, after receiving the confirmation information from the switches 130 and 140 within the timing range of the master controller timer, the master controller 310 transmits the confirmation information to the source switch 150 through the master channel and other channels.

At step 7, after the source switch 150 receives the confirmation information transmitted by the master controller 310 within the timing range of the source switch timer, the process of the information transmission of the network device system ends. If the source switch 150 does not receive the confirmation information transmitted by the master controller 310 within the timing range of the source switch timer, step 1 is returned to and the link state change information is retransmitted to the master controller 310.

Figure 12:
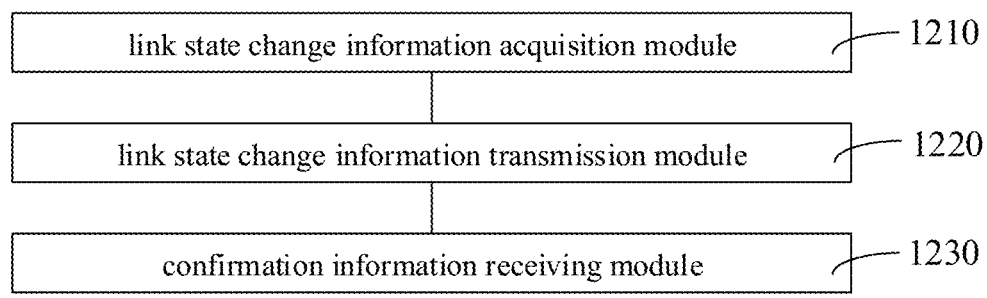
FIG. 12 is a structural block diagram illustrating a fault-tolerant apparatus for a network device system according to an embodiment.

In a fourth aspect, in an embodiment, as shown in FIG. 12, a fault-tolerant device for a network device system is provided, which is applied to a source switch. The device includes: a link state change information acquisition module 1210, a link state change information transmission module 1220 and a confirmation information receiving module 1230.

The link state change information acquisition module 1210 is configured to acquire link state change information when a link state changes.

The link state change information transmission module 1220 is configured to transmit the link state change information to a master controller, randomly select a switch from a first switch unit or a second switch unit, and transmit a copy of the link state change information to the switch selected by the source switch; the master controller forwards the link change state information to the second switch unit, the switch selected by the source switch transmits the copy of the link state change information to an auxiliary controller, and the auxiliary controller transmits the copy of the link state change information to the second switch unit; the first switch unit includes each switch outside an influence range of the change of the link state, and the second switch unit includes each switch within the influence range of the change of the link state.

The confirmation information receiving module 1230 is configured to receive confirmation information transmitted by the master controller after the second switch unit updates the local routing table according to the link state change information or the copy of the link state change information.

In an embodiment, the link state change information transmission module 1220 includes the following units:
- a first transmission unit for a copy of link change state information, configured to transmit the copy of the link state change information to the auxiliary controller by the switch selected by the source switch;
- a second transmission unit for a copy of link change state information, configured to randomly select, by the auxiliary controller, a switch from the first switch unit and transmit the copy of the link state change information to the switch selected by the auxiliary controller;
- a third transmission unit for a copy of link change state information, configured to transmit the copy of the link state change information to the second switch unit by the switch selected by the auxiliary controller.

In an embodiment, the fault-tolerant device for the network device system further includes a source switch timer module 1240; and the source switch timer module 1240 includes the following units:
- a source switch timer starting unit, configured to start a source switch timer;
- a source switch confirmation information receiving unit, configured to receive confirmation information transmitted by the master controller within a timing range of the source switch timer after the second switch unit updates a local routing table according to the link state change information or the copy of the link state change information;
- a source switch step returning unit, configured to return to the step of transmitting the link state change information to the master controller when no confirmation information of the master controller is received beyond the timing range of the source switch timer.

Figure 13:
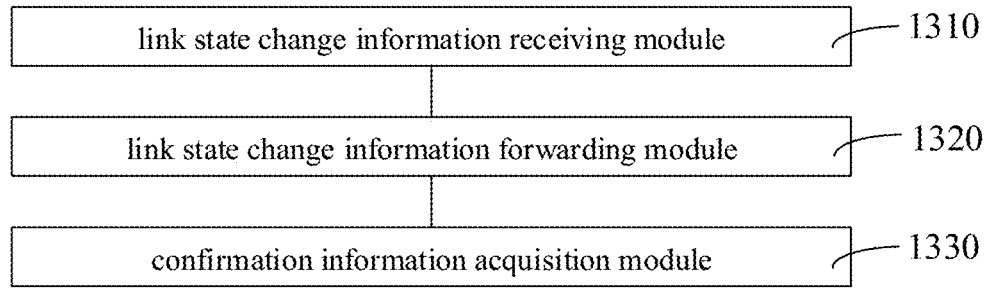
FIG. 13 is a structural block diagram illustrating a fault-tolerant apparatus for a network device system according to another embodiment.

In a fifth aspect, in an embodiment, as shown in FIG. 13, a fault-tolerant device for a network device system is provided, which is applied to a master controller. The device includes: a link state change information receiving module 1310, a link state change information forwarding module 1320 and a confirmation information acquisition module 1330.

The link state change information receiving module 1310 is configured to receive the link state change information transmitted by the source switch.

The link state change information forwarding module 1320 is configured to forward the link state change information to the second switch unit when determining that the link state is updated according to the link state change information; the second switch unit includes each switch within an influence range of the change of the link state.

The confirmation information acquisition module 1330 is configured to acquire the confirmation information after the second switch unit updates the local routing table according to the link state change information and the copy of the link state change information transmitted by the switch selected by the auxiliary controller, and transmit the confirmation information to the source switch.

In an embodiment, the fault-tolerant device for the network device system further includes a master controller timer module 1340; and the master controller timer module 1340 includes the following units:
- a master controller timer start unit, configured to start the master controller timer;
- a master controller confirmation information transmission unit, configured to acquire the confirmation information within the timing range of the master controller timer after the second switch unit updates the local routing table according to the link state change information and the copy of the link state change information transmitted by the switch selected by the auxiliary controller, and transmit the confirmation information to the source switch;
- a master controller step returning unit, not configured to perform the step of transmitting the confirmation information to the source switch when no confirmation information of the second switch unit is received beyond the timing range of the master controller timer.

For the specific limitation of the fault-tolerant device for the network device system, reference can be made to the above limitation of the fault-tolerant method for the network device system, which will not be repeated here. Each module in the fault-tolerant device for the above-mentioned network device system can be implemented in whole or in part by software, hardware, and a combination thereof. The above-mentioned modules may be embedded in the form of hardware or independent of the processor in the computer equipment, or may be stored in the memory of the computer device in the form of software, so that the processor can call and execute the operations corresponding to the above-mentioned modules.

Figure 14:
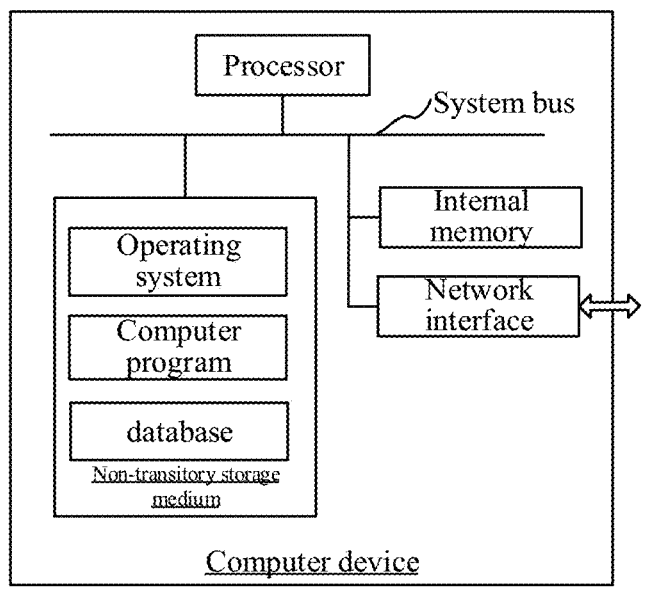
FIG. 14 is a schematic diagram illustrating an internal structure of a computer device according to an embodiment.

In an embodiment, a computer device is provided. The computer device may be a server, and its internal structure diagram may be as shown in FIG. 14. The computer device includes a processor, a memory, and a network interface connected through a system bus. The processor of the computer device is configured to provide calculation and control capabilities. The memory of the computer device includes a non-transitory storage medium and an internal memory. The non-transitory storage medium stores an operating system, a computer program, and a database. The internal memory provides an environment for the operation of the operating system and computer programs in the non-transitory storage medium. The database of the computer device is configured to store the fault-tolerant data of the network device system. The network interface of the computer device is configured to communicate with an external terminal through a network connection. The computer program is executed by the processor to implement a fault-tolerant method for the network device system.

Those skilled in the art can understand that the structure shown in FIG. 14 is only a block diagram of part of the structure related to the solution of the present disclosure, and does not constitute a limitation on the computer device to which the solution of the present disclosure is applied. The specific computer device may include more or less parts than shown in the figure, or combining some parts, or having a different arrangement of parts.

In an embodiment, a computer device is provided, including a processor and a memory storing a computer program, the processor, when executing the computer program, implements the fault-tolerant method for the network device system according to any of the second or third aspect.

In an embodiment, a computer-readable storage medium is provided, on which a computer program is stored, the computer program, when executed by a processor, implements the fault-tolerant method for the network device system according to any one of the second or third aspect.

A person of ordinary skill in the art can understand that all or part of the processes in the method of the foregoing embodiments can be implemented by instructing relevant hardware through a computer program. The computer program can be stored in a non-transitory computer-readable storage medium, when the computer program is executed, it may include the procedures of the above-mentioned method embodiments. Any reference to the memory, storage, database or other media used in the embodiments provided in this disclosure may include at least one of non-transitory and transitory memory. Non-transitory memory may include Read-Only Memory (ROM), magnetic tape, floppy disk, flash memory, or optical memory. Transitory memory may include Random Access Memory (RANI) or external cache memory. As an illustration and not a limitation, RANI can be in various forms, such as Static Random Access Memory (SRAM) or Dynamic Random Access Memory (DRAM).

The technical features of the above embodiments can be combined arbitrarily. In order to make the description concise, all possible combinations of the technical features in the above embodiments are not described. However, as long as there is no contradiction in the combination of these technical features, they should be considered as the scope of the present disclosure.

The above-mentioned embodiments only express several exemplary embodiments of the present disclosure, and their descriptions are more specific and detailed, but they should not be regarded as a limitation on the scope of the disclosure. It should be pointed out that those of ordinary skill in the art can make several modifications and improvements without departing from the concept of the disclosure, and these all fall within the protection scope of the disclosure. Therefore, the scope of protection of the present disclosure shall be subject to the appended claims.

What is claimed is:

1. A network device system, comprising a source switch, a first switch unit, a second switch unit, a master controller, and an auxiliary controller;
   wherein, the source switch is configured to, when a link state changes, acquire link state change information, transmit the link state change information to the master controller, randomly select a switch from the first switch unit or the second switch unit, and transmit a copy of the link state change information to the switch selected by the source switch; wherein the first switch unit comprises each switch outside an influence range of the change of the link state, and the second switch unit comprises each switch within the influence range of the change of the link state;
   the master controller is configured to receive the link state change information, and forward the link state change information to the second switch unit when determining that the link state is updated according to the link state change information;
   the switch selected by the source switch is configured to acquire the copy of the link state change information, and transmit the copy of the link state change information to the auxiliary controller;
   the auxiliary controller is configured to: receive the copy of the link state change information transmitted by the switch selected by the source switch, and randomly select a switch from the first switch unit, and transmit the copy of the link state change information to the second switch unit through the switch selected by the auxiliary controller;
   the second switch unit is configured to: acquire the link state change information transmitted by the master controller and acquire the copy of the link state change information forwarded by the switch selected by the auxiliary controller, update a local routing table according to the link state change information or the copy of the link state change information, and transmit confirmation information to the master controller after updating the local routing table;
   the master controller is configured to receive the confirmation information after the second switch unit updates the local routing table, and transmit the confirmation information to the source switch;
   the source switch is configured to receive the confirmation information transmitted by the master controller.

2. A fault-tolerant method for a network device system, applied to a source switch, the method comprising:
   acquiring link state change information when a link state changes;
   transmitting the link state change information to a master controller, randomly selecting a switch from a first switch unit or a second switch unit, and transmitting a copy of the link state change information to the switch selected by the source switch, such that the master controller forwards the link state change information to the second switch unit, and the switch selected by the source switch transmits the copy of the link state change information to the auxiliary controller, and the auxiliary controller transmits the copy of the link state change information to the second switch unit, wherein the first switch unit comprises each switch outside an influence range of the change of the link state, and the second switch unit comprises each switch within the influence range of the change of the link state;
   receiving confirmation information transmitted by the master controller after the second switch unit updates a local routing table according to the link state change information or the copy of the link state change information.

3. The fault-tolerant method for the network device system according to claim 2, wherein the step that the switch selected by the source switch transmits the copy of the link state change information to the auxiliary controller, and the auxiliary controller transmits the copy of the link state change information to the second switch unit comprises:
   transmitting, by the switch selected by the source switch, the copy of the link state change information to the auxiliary controller;
   randomly selecting, by the auxiliary controller, a switch from the first switch unit, and transmitting the copy of the link state change information to the switch selected by the auxiliary controller;
   transmitting, by the switch selected by the auxiliary controller, the copy of the link state change information to the second switch unit.

4. The fault-tolerant method for the network device system according to claim 2, further comprising:
   after transmitting the link state change information to the master controller,
   starting a source switch timer;
   receiving the confirmation information transmitted by the master controller in a timing range of the source switch timer after the second switch unit updates the local routing table according to the link state change information or the copy of the link state change information;
   returning to the step of transmitting the link state change information to the master controller when no confirmation information of the master controller is received beyond the timing range of the source switch timer.

5. A fault-tolerant method for a network device system, applied to a master controller, the method comprising:
   receiving link state change information transmitted by a source switch;
   forwarding the link state change information to a second switch unit when determining that a link state is updated according to the link state change information, wherein the second switch unit comprises each switch within an influence range of the change of the link state;

acquiring confirmation information after the second switch unit updates a local routing table according to the link state change information and a copy of the link state change information transmitted by a switch which is selected by an auxiliary controller, and transmitting the confirmation information to the source switch.

6. The fault-tolerant method for the network device system according to claim 5, further comprising:

after forwarding the link state change information to the second switch unit when determining that the link state is updated according to the link state change information, starting a master controller timer;

acquiring the confirmation information in a timing range of the master controller timer after the second switch unit updates a local routing table according to the link state change information and the copy of the link state change information transmitted by the switch which is selected by the auxiliary controller, and transmitting the confirmation information to the source switch;

transmitting no confirmation information to the source switch when no confirmation information of the second switch unit is received beyond the timing range of the master controller timer.

7. A fault-tolerant apparatus for a network device system, applied to a source switch, the apparatus comprising: a processor and a memory for storing instructions executed by the processor;

wherein the processor is configured to:

acquire link state change information when a link state changes;

transmit the link state change information to a master controller, and randomly select a switch from a first switch unit or a second switch unit, and transmit a copy of the link state change information to the switch selected by the source switch, such that the master controller forwards the link state change information to the second switch unit, and the switch selected by the source switch transmits the copy of the link state change information to an auxiliary controller, and the auxiliary controller transmits the copy of the link state change information to the second switch unit by the auxiliary controller; wherein the first switch unit comprises each switch outside an influence range of the change of the link state, the second switch unit comprises each switch within the influence range of the change of the link state;

receive confirmation information transmitted by the master controller after the second switch unit updates a local routing table according to the link state change information or the copy of the link state change information.

8. A fault-tolerant apparatus for a network device system, applied to a master controller, the apparatus comprising: a processor and a memory for storing instructions executed by the processor;

wherein the processor is configured to:

receive link state change information transmitted by a source switch;

forward the link state change information to a second switch unit when determining that a link state is updated according to the link state change information, wherein the second switch unit comprises each switch in an influence range of the change of the link state;

acquire the confirmation information after the second switch unit updates a local routing table according to the link state change information and a copy of the link state change information transmitted by the switch selected by the auxiliary controller, and transmit the confirmation information to the source switch.

9. A computer device, comprising a processor, and a memory storing a computer program, wherein the processor, when executing the computer program, implements the method of claim 2.

10. A non-transitory computer-readable storage medium, on which a computer program is stored, wherein the computer program, when executed by a processor, causes the processor to implement the steps of the method of claim 2.

11. A computer device, comprising a processor, and a memory storing a computer program, wherein the processor, when executing the computer program, implements the method of claim 5.

12. A non-transitory computer-readable storage medium, on which a computer program is stored, wherein the computer program, when executed by a processor, cause the processor to implement the steps of the method of claim 5.

* * * * *